United States Patent
Nordman

(10) Patent No.: US 7,120,207 B2
(45) Date of Patent: Oct. 10, 2006

(54) TRANSMISSION METHOD AND RADIO RECEIVER

(75) Inventor: Risto Nordman, Oulu (FI)

(73) Assignee: Nokia Corporation, Espoo (FI)

( * ) Notice: Subject to any disclaimer, the term of this patent is extended or adjusted under 35 U.S.C. 154(b) by 959 days.

(21) Appl. No.: 10/032,300

(22) Filed: Dec. 31, 2001

(65) Prior Publication Data

US 2003/0123575 A1    Jul. 3, 2003

(51) Int. Cl.
*H03D 1/00* (2006.01)
*H03M 13/03* (2006.01)

(52) U.S. Cl. .................... 375/341; 714/792

(58) Field of Classification Search ............ 375/341, 375/262, 316, 340; 714/786, 792, 794–798
See application file for complete search history.

(56) References Cited

U.S. PATENT DOCUMENTS 5,712,877 A * 1/1998 Ho et al. .................. 375/284

OTHER PUBLICATIONS

D'Andrea et al., "Multiple Phase Synchronization in Cxontinuous Phase Modulation," Digital Signal Processing 3, (1993), pp. 188-198.

de Jager et al., "Tamed Frequency Modulation, a Novel Method to Achieve Spectrum Economy in Digital Transmission," IEEE Transactions on Communications, vol. Com 26, No. 5, May, 1978, pp. 534-542.

(Continued)

*Primary Examiner*—Tesfaldet Bocure
(74) *Attorney, Agent, or Firm*—Pillsbury Winthrop Shaw Pittman LLP

(57) ABSTRACT

The invention relates to a method and a receiver for obtaining a soft decision in detection of a TFM signal. In the method, the phase of a signal sample is reversed rotated twice in the way that the real part of the sample indicates the phase of the sample and that the rotation is opposite to the phase belonging to the old state of a trellis diagram. Transition metrics are completed with the aid of the real part of the signal sample. Then path metrics are computed, the path with larger metrics is selected as a survivor and the survivor with the largest metric is selected as the best survivor. The sign of the demodulated bit is determined and the weight of the demodulated bit is calculated.

32 Claims, 3 Drawing Sheets

OTHER PUBLICATIONS

Aulin et al., "Continuous Phase Modulation—Part II: Partial Response Signaling," IEEE Transactions on Communications, vol. Com 29, No. 3, Mar. 1981, pp. 210-225.

Hagenauer et al., "A Viterbi Algorithm with Soft-Decision Outputs and its Applications," GlobeCom '89, Dallas Texas, pp. 1680-1686.

Aulin et al., "Continuous Phase Modulation—Part I: Full Response Signaling," IEEE Transactions on Communications, vol. Com 29, No. 3, Mar. 1981, pp. 196-209.

Berrou et al., "A Low Complexity Soft-Output Viterbi Decoder Architecture," IEEE 1993, pp. 737-740.

Sundberg, "Continuous Phase Modulation," IEEE Communications Magazine, Apr. 1986—vol. 214, No. 4, pp. 25-38.

Mengali et al., "Synchronization Techniques for Digital Receivers," Applications of Communication: Theory, (New York and London: Plenum Press, 1997) Table of Contents and Introduction.

Eyuboglu et al., "Reduced-State Sequence Estimation with Set Partitioning and Decision Feedback," IEEE Transactions on Communications, vol. 36, No. 1, Jan. 1988, pp. 13-20.

Nordman et al., "A Turbo Decoder with the Berrou SOVA Algorithm," 2$^{nd}$ International Symposium on Turbo Codes & Related Topics, Brest, France, 2000, pp. 299-302.

Balasubramanian et al., Optimal and Suboptimal Symbol- by-Symbol Demodulation of Continuous Phase Modulated Signals, IEEE Transactions on Communications, vol. 46, No. 12, Dec. 1998, pp. 1662-1668.

* cited by examiner

TRANSMISSION METHOD AND RADIO RECEIVER

FIELD

The object of the invention is a method for obtaining soft decisions in detection of a TFM signal and a radio receiver.

BACKGROUND

Nowadays there are many different modulation methods for telecommunication systems. In most cases the resultant modulated signals have a variable amplitude. However, in radio communication systems, constant envelope modulated signals are preferable in most cases due to the existing system constraints in power economy and the consequent use of nonlinear power amplifiers. Thus, it can be said that usually frequency modulation is more suitable for telecommunication systems. Unfortunately, the spectrum of a frequency modulated signal is typically relatively wide. A narrow spectrum is needed particularly in microwave radio systems. In order to narrow the spectrum, a channel filter with a precisely prescribed attenuation and phase characteristic may be used, but this is not preferable in radio systems.

Tamed Frequency Modulation (TFM) has a narrow spectrum and good spectral efficiency and therefore it is suitable for systems where a narrow spectrum is needed, like microwave radio systems.

In radio telecommunication systems a signal propagates on a radio channel as an electromagnetic wave-motion from a transmitter to a receiver. In the channel, the signal alters due to other radio signals, noise and other reasons. Therefore, the received signal differs from the transmitted signal. In the receiver, the received signal has to be detected despite the distortion. Different detection methods have been developed for detecting distorted signals. In the case where a transmitted symbol depends on more than one data symbol, the encoder is said to have memory and decoding is in many cases accomplished by applying trellis. One algorithm which utilizes a trellis-diagram is called Viterbi-algorithm. The Viterbi algorithm leads to the optimum decoding in the maximum likelihood sense.

There is a need to find an effective transmission method when a narrow spectrum, good spectral efficiency and a method for detecting distorted signals are needed.

Short Description

The object of the invention is to provide an improved method and receiver. According to an aspect of the present invention, a method for obtaining a soft decision in detection of a TFM signal is specified. The method comprises: sampling a received signal, reverse rotating the phase of a signal sample in the way that the real part of a complex signal indicates the phase of the sample, reverse rotating the phase changes of possible transitions determined by the modulation method used so that the rotation is opposite to the phase belonging to the old state of a trellis diagram, computing transition metrics for the state transitions in a trellis diagram with the aid of the real part of the signal sample and computing path metrics for each survivor path, selecting the path with larger metrics as a survivor from paths entering a state node, and the phase of that survivor is set as the phase state of the new correlative state in question, selecting the survivor with the largest metric as the best survivor, determining the sign of the demodulated bit with the aid of the last bit of the previous state of the best survivor and calculating the weight of the demodulated bit as the difference of the path metrics of the best survivor and a selected path joining it.

The invention also relates to a second method for obtaining a soft decision in detection of a TFM signal. The second method comprises: sampling a received signal, reverse rotating the phase of a signal sample in the way that the real part of a complex signal indicates the phase of the sample, reverse rotating the phase changes of possible transitions determined by the modulation method used so that the rotation is opposite to the phase belonging to the old state of a trellis diagram, rotating a carrier phase, computing transition metrics for the state transitions in a trellis diagram with the aid of the real part of the signal sample and computing path metrics for each survivor path, selecting the path with larger metrics as a survivor from paths entering to a state node, and the phase of that survivor is set as the phase state of the new correlative state in question, selecting the survivor with the largest metric as the best survivor, determining the sign of the demodulated bit with the aid of the last bit of the previous state of the best survivor and calculating the weight of the demodulated bit as the difference of the path metrics of the best survivor and a selected path joining it.

The invention also relates to a third method for obtaining a soft decision in detection of a TFM signal. The third method comprises: sampling a received signal, reverse rotating the phase of a signal sample in the way that the real part of a complex signal indicates the phase of the sample, reverse rotating the phase changes of possible transitions determined by the modulation method used so that the rotation is opposite to the phase belonging to the old state of a trellis diagram, computing transition metrics for the state transitions in a trellis diagram with the aid of the real part of the signal sample using two earlier symbols as an original state of the trellis and computing path metrics for each survivor path, selecting the path with larger metrics as a survivor from paths entering a state node, and the phase of that survivor is set as the phase state of the new correlative state in question, selecting the survivor with the largest metric as the best survivor, determining the sign of the demodulated bit with the aid of the last bit of the previous state of the best survivor and calculating the weight of the demodulated bit as the difference of the path metrics of the best survivor and a selected path joining it.

The invention also relates to a fourth method for obtaining a soft decision in detection of a TFM signal. The fourth method comprises: sampling a received signal, reverse rotating the phase of a signal sample in the way that the real part of a complex signal indicates the phase of the sample, reverse rotating the phase changes of possible transitions determined by the modulation method used so that the rotation is opposite to the phase belonging to the old state of a trellis diagram, rotating a carrier phase, computing transition metrics for the state transitions in a trellis diagram with the aid of the real part of the signal sample using two earlier symbols as the original state of the trellis and computing path metrics for each survivor path, selecting the path with larger metrics as a survivor from paths entering a state node, and the phase of that survivor is set as the phase state of the new correlative state in question, selecting the survivor with the largest metric as the best survivor, determining the sign of the demodulated bit with the aid of the last bit of the previous state of the best survivor and calculating the weight of the demodulated bit as the difference of the path metrics of the best survivor and a selected path joining it.

According to an aspect of the present invention, a receiver for obtaining a soft decision in detection of a TFM signal is provided. The receiver comprises means for sampling a received signal, means for reverse rotating the phase of a signal sample in the way that the real part of a complex signal indicates the phase of the sample, means for reverse rotating the phase changes of possible transitions determined by the modulation method used so that the rotation is opposite to the phase belonging to the old state of a trellis diagram, means for computing transition metrics for the state transitions in a trellis diagram with the aid of the real part of the signal sample and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

The invention also relates to a second receiver for obtaining a soft decision in detection of a TFM signal. The second receiver comprises means for sampling a received signal, means for reverse rotating the phase of a signal sample in the way that the real part of a complex signal indicates the phase of the sample, means for reverse rotating the phase changes of possible transitions determined by the modulation method used so that the rotation is opposite to the phase belonging to the old state of a trellis diagram, means for rotating a carrier phase, means for computing transition metrics for the state transitions in a trellis diagram with the aid of the real part of the signal sample and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

The invention also relates to a third receiver for obtaining a soft decision in detection of a TFM signal. The third receiver comprises sampling a received signal, means for reverse rotating the phase of a signal sample in the way that the real part of a complex signal indicates the phase of the sample, means for reverse rotating the phase changes of possible transitions determined by the modulation method used so that the rotation is opposite to the phase belonging to the old state of a trellis diagram, means for computing transition metrics for the state transitions in a trellis diagram with the aid of the real part of the signal sample using two earlier symbols as an original state of the trellis and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

The invention also relates to a fourth receiver for obtaining a soft decision in detection of a TFM signal. The fourth receiver comprises means for sampling a received signal, means for reverse rotating the phase of a signal sample in the way that the real part of a complex signal indicates the phase of the sample, means for reverse rotating the phase changes of possible transitions determined by the modulation method used so that the rotation is opposite to the phase belonging to the old state of a trellis diagram, means for rotating a carrier phase, means for computing transition metrics for the state transitions in a trellis diagram with the aid of the real part of the signal sample using two earlier symbols as the original state of the trellis and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

Other preferred embodiments of the invention are disclosed in the dependent claims.

By means of the method of the invention, a weighting coefficient which indicates the reliability of a bit decision can be obtained in addition to hard bit decisions from a TFM demodulator based on the Viterbi algorithm without substantially increasing the complexity of the demodulator or the delay. Weighting coefficients can be utilized particularly when a channel code concatenated serially with TFM modulation is used. A channel decoder, which receives soft decisions from the demodulator, can at best improve coding gain by 2 dB compared to a corresponding decoder which utilizes only hard decisions.

The invention is largely based on a TFM/Viterbi demodulator which outputs hard decisions and utilizes RSSD technique (reduced state sequence detection). In the TFM the phase angle of a signal is determined by adding the rotation of the state defined by three successive data bits to the preceding state. In the RSSD algorithm the phase statuses are not added to the trellis but the preceding state is always calculated according to the survivor to be included in each old state. This yields a four-state trellis where the old state related to a symbol instant consists of two first bits that determine the state rotation and the new state consists of the two last bits. The transition from the old state to the new state is thus defined unambiguously when all the three bits that determine the state rotation are known.

A complex sample read in the channel is divided into eight different branches in a filter bank and phase angle rotation is performed in each branch, the rotation being opposite to the phase angle rotation determined by the transition attached to the branch in question. After this, a second phase angle rotation is performed in each branch, the rotation being opposite to the phase to be provided for the old state. The phase angle of the trellis branch to be attached to the symbol transmitted after these rotations should be zero, and thus simply the real part of a complex sample can be used as the transition metrics. After this, the transition metrics are added to old path metrics and the survivors of the new states are selected according to the new path metrics. The final bit decisions are made at an instant following the survivor length on the basis of the path according to the current best survivor.

Soft decisions are obtained using the path metrics calculated above. The weighting coefficient of a bit is calculated by simply subtracting the metrics of a competing path from the metrics of the best survivor. Since the decision on the best survivor is not made until at an instant following the survivor length, the system requires memory for storing the metrics. The path that will enter the new state together with the best survivor is selected as the competing path, i.e. the path that would have given a bit decision with a different sign and which is rejected at the instant the bit decision is made. Furthermore, since in the TFM errors occur as bursts of two bits, the weighting coefficient is checked at the instant following the bit decision. If the competing path that is to enter the same state with the best survivor gives a smaller weighting coefficient and a bit decision with a different sign, the weighting coefficient of the bit decoded at the preceding instant is replaced with a smaller weighting coefficient. However, bit decisions, i.e. the sign of the bit to be decoded, are always determined according to the best survivor.

By means of the invention soft decisions can be obtained from the TFM demodulator, which can be implemented by a relatively simple solution.

BRIEF DESCRIPTION OF THE FIGURES

Preferred embodiments of the invention are described below by way of example and with reference to the attached drawings, in which.

DESCRIPTION OF EMBODIMENTS

Figure 1:
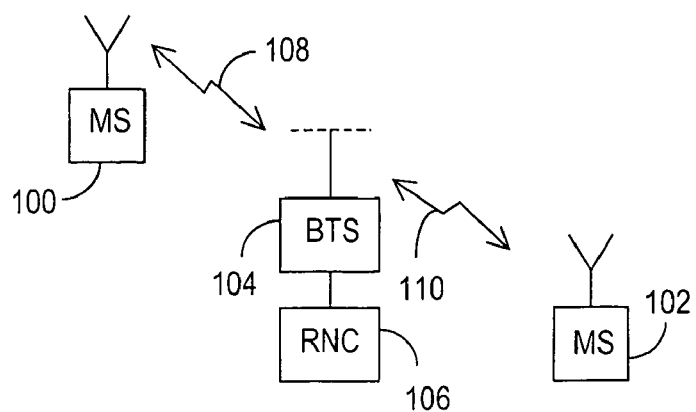
FIG. 1 is a simplified block diagram illustrating an example of a radio system.

FIG. 1 illustrates a simplified version of a digital telecommunications system where the solution according to the invention can be applied. This is part of a cellular radio network, which comprises a base station 104, which has a radio connection 108 and 110 to subscriber terminals 100 and 102, which may be fixed, placed in a vehicle or portable. The base station includes transceivers. There is a connection from the transceivers of the base station to an antenna unit, which establishes a radio connection to the subscriber terminal. The base station is further connected to a base station controller 106, which transmits the connections of the terminals to the other parts of the network. The base station controller centrally controls several base stations that communicate with it. A control unit located in the base station controller performs call controlling, mobility management, collection of statistics and signalling.

There may also be a connection from the cellular radio system to a public switched telephone network. The invention is based on TFM modulation, which is suitable e.g. for microwave systems thanks to its narrow spectrum.

Next the Tamed Frequency Modulation is explained in more detail. The complex envelope expression of the modulated signal is $$s(t) = \sqrt{\frac{E_s}{T}} e^{j\phi(t,\alpha)}, \quad (1)$$

where
$E_s$=symbol energy,
$T$=symbol time, i.e. time between two consequent data symbols,
$j$=imaginary unit satisfying $j^2=-1$,
$\phi(t,\alpha)$=phase function,
$t$=time,
$\alpha=\alpha_0\ \alpha_1\ \alpha_2\ \alpha_3\ \ldots$, where $\alpha_i \in \{-1, 1\}$ is the ith data symbol.

In a known Additive White Gaussian Noise (AWGN) channel the optimal coherent maximum likelihood detector of a TFM modulated signal can be implemented with a bank of matched filters and the Viterbi algorithm. In the frequency modulation, the desired variation of the phase of the signal as a function of time represents the data. The phase difference between two consequent symbol instants, the code rule, can be expressed as follows $$\phi(kT+T) - \phi(kT) = 2\pi h \sum_{i=-\infty}^{\infty} \alpha_{k-i}[q(iT+T) - q(iT)], \quad (2)$$

in which
k=an integer number, k=1, 2, 3, ...,
h=modulation index,
q(t)=integral of the frequency pulse g(t),
$\Sigma$=sum,
T=symbol time, i.e. time between two consequent data symbols,
$\phi$=phase,
i=an integer number,
where
The frequency pulse g(t) is normalised so that $$q(iT+T) - q(iT) = \int_{iT}^{(i+1)T} g(t)\,dt = \begin{cases} 1/8 & \text{for } |i|=1, \\ 1/4 & \text{for } |i|=0, \\ 0 & \text{otherwise.} \end{cases} \quad (3)$$

in which
i=an integer number,
T=symbol time, i.e. time between two consequent data symbols,
q(t)=integral of the frequency pulse g(t)
t=time,
g(t)=frequency pulse,
$\int$=integral,
| |=absolute value.

In more detail, the frequency pulse g(t) is defined as $$g(t) = \frac{1}{8}g_0(t-T) + \frac{1}{4}g_0(t) + \frac{1}{8}g_0(t+T), \quad (4)$$

in which
T=symbol time, i.e., time between two consequent data symbols, where $$g_0(t) \approx \sin\left(\frac{\pi t}{T}\right)\left[\frac{1}{\pi t} - \frac{2 - \frac{2\pi t}{T}\cot\left(\frac{\pi t}{T}\right) - \frac{\pi^2 t^2}{T^2}}{\frac{24\pi t^3}{T^2}}\right], \quad (5)$$

in which

T=symbol time, i.e. time between two consequent data symbols, t=time, sin=sine function, cot=cotangent function.

If the modulation index h=½, then the phase difference of two consequent symbol instants becomes $$\phi(kT+T) - \phi(kT) = (\pi/2) \cdot (\alpha_{k-1}/4 + \alpha_{k-1}/2 + \alpha_{k+1}/4), \quad (6)$$

in which

T=symbol time, i.e. time between two consequent data symbols, k=an integer number, $\alpha_k \in \{-1, 1\}$ is the kth data symbol.

Thus, if an error occurs in the demodulator, there are two consequent incorrect bits in the output of the demodulator.

Figure 3:
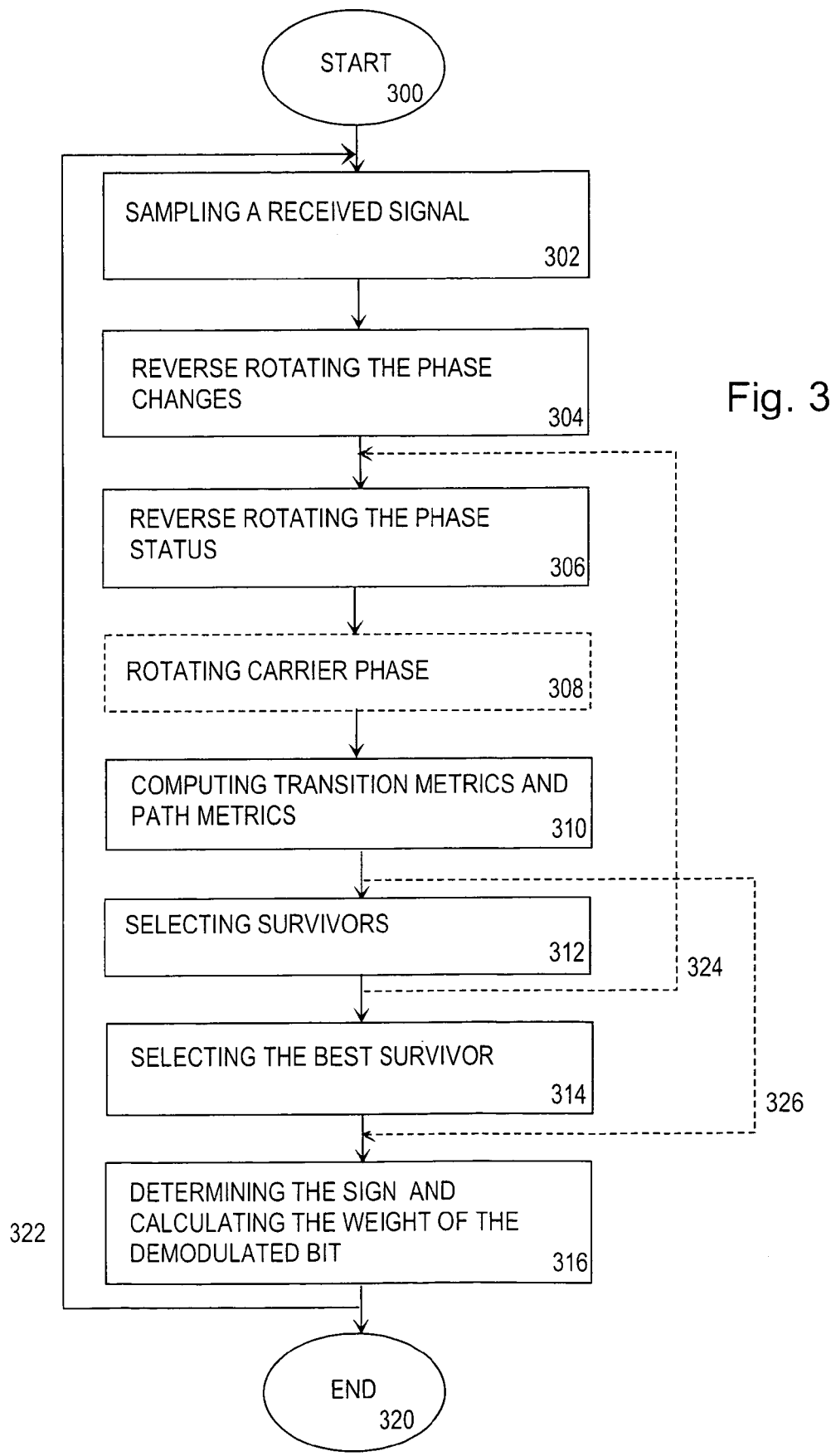
FIG. 3 is a flow chart.

Next a method for obtaining soft decisions in detection of a TFM signal is described with the aid of the FIG. 3. The execution of the method starts from block 300.

In block 302 a received signal is sampled. The sampling moments are typically synchronised with the transmitter, which can be done by significantly oversampling the signal and with a special algorithm extracting the samples where the synchronisation is the best. Synchronisation is out of the scope of this application; adequate algorithms are well-known in the art.

The reverse rotation of the phase of a signal sample is performed in block 304. The aim of this is to reverse any rotation (phase changes) carried out by the modulator so as to attain complex samples with a zero argument, after which only the real parts are compared. The rotation is performed by using a filter bank. Typically, the phase of the signal is changed by multiplying the signal by an appropriate complex phasor. In any symbol instant k, there is a transition from the old state $(\alpha_{k-1}, \alpha_k)$ to the new state $(\alpha_k, \alpha_{k+1})$ in the trellis. Since each $\alpha_i$ has two possible values, a trellis is considered to have four states. Consequently, there are eight possible transitions $(\alpha_{k-1}, \alpha_k, \alpha_{k+1})$ from an old state to a new one. The phase changes resulting from each transition are ruled by equation (6). Therefore, they can be calculated in advance and phasors with the opposite angle can be preserved in the filterbank. At the output of the filterbank there are eight signal values, in which the phase changes of eight possible transitions have been rotated backwards.

In block 306, a rotation of the phase status is performed on each eight possible transitions, the rotation being opposite to the phase belonging to the old state. Those phases are known since they are the same as the phases belonging to the new states of the survivor paths in the previous time instants. Therefore, there is preferably a feedback 324 to the previous phase rotator block 306 from block 312 at the previous time instant. An additional rotation step is typically needed in addition to 304 and 306. Namely, the carrier phase may differ from zero, and if so, the carrier phase should also be rotated back from the samples. This is done in block 308. The technique for how to estimate the carrier phase is well-known in the art and therefore it is not described here in more detail. Carrier phase synchronisation is explained in more detail for instance in the article: Multiple Phase Synchronisation in Continuous Phase Modulation, A. N. D'Andrea, U. Mengali, G. M. Vitetta, Digital Signal Processing 3 (1993), pages 188–198, which is incorporated herein by reference.

Hence, one ends up in a situation where the rotated complex sample of the correct transition has the zero argument. Or to be more precise, the argument would be zero if there were no noise and signal distortion in the system. Therefore, the real part of the rotated sample is a reasonable branch metric in the trellis.

In block 310 there are eight branch metrics which correspond to the eight possible transitions, are calculated and added to the path metrics of the old states, thus forming new path metrics. All eight new path metrics have to be preserved and passed via a delay line 326 to weighting 316 that processes the data at the time instant after the survivor length.

In block 312 the path with larger metrics is selected as a survivor from two paths entering the same new node (in a trellis, state, edge and node are different names for the same concept), and its phase is assigned as the phase state of the new correlative state in question. In block 314 the survivor with the largest metric is chosen to be the best survivor. Typically, survivor length of 10 is long enough to guarantee that all competing paths with a relatively large metric as the survivor length of an earlier time instant have joined to the best survivor.

Block 316 is the one where the actual soft decisions are calculated. It receives the new correlative state of the best survivor from block 314 and the path metrics of transitions of earlier survivors from the delay line mentioned earlier. Preferably, a FIFO memory with register exchange logic is applied so that the entries belonging to the best survivor can be directly fetched from its rear end. The last bit of the previous correlative state is picked from the transition of the best survivor and the sign of the weighted bit is determined to be negative in the case of −1 bit. The new state of the best survivor is extracted for weighting and the initial weighting coefficient or weight is calculated as the difference of the path metrics of the best survivor and the concurrent path joining it in the new state.

After that, one step is taken backwards in the trellis and the weighting coefficient of the previous bit that was initialised one time instant earlier is revised. The previous transitions of the survivor and concurrent paths are picked and it is checked whether their last bits are the same or not. If the last bits had differed, the selection of the concurrent path would have changed the polarity of the previous bit, thus the current metric difference has impact on the reliability of the previous bits. Therefore, the smaller one of the current or previous weighting coefficients or weights is assigned to the weight of the weighting coefficient of the previous bit. The sign is not revised; it is determined by the best survivor.

After initialisation and one weight revision, the value of the weighted bit is written to the output as the soft decision of the TFM demodulator.

Figure 4:
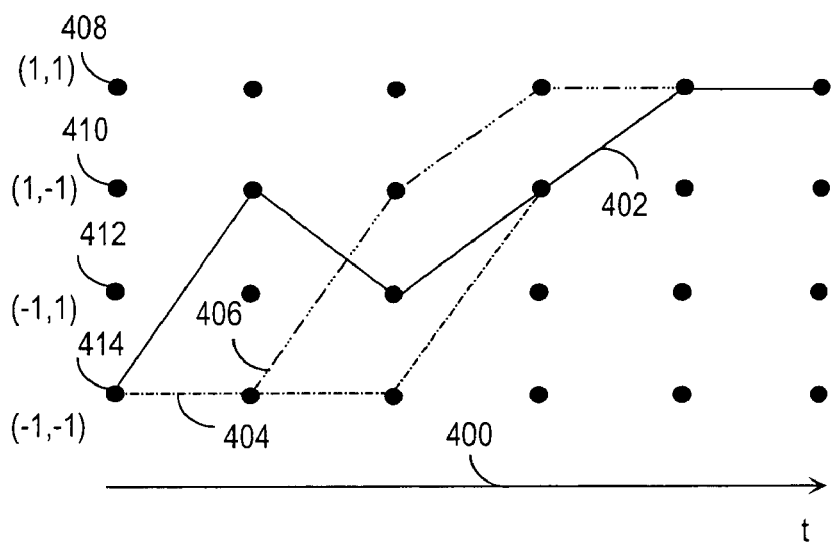
FIG. 4 shows a trellis diagram according to an embodiment of the invention.

The method is described in more detail on the basis of the example given in FIG. 4. FIG. 4 shows an example of a trellis structure of the soft decision TFM demodulator.

The binary information sequence $\alpha = \alpha_0, \alpha_1, \alpha_2, \ldots, \alpha_n$, where each $\alpha_i \in \{-1, 1\}$ is transmitted. The new phase is a function of the previous phase and three consequent data symbols according to formulas (1)–(5). The optimum Viterbi demodulator requires metric calculation for any previous phase and sets of three consequent data bits. However, the reduced state sequence detection (RSSD) algorithm is used to reduce complexity. In the RSSD algorithm a trellis consisting of four correlative states is applied. The phase change is dictated by the transition $(\alpha_{k-1}, \alpha_k, \alpha_{k+1})$, where $k=1, 2, \ldots, n$, and the metric is calculated for the eight possible transitions. The old correlative state consists of bits $(\alpha_{k-1}, \alpha_k)$ and the new correlative state of bits $(\alpha_k, \alpha_{k+1})$. Therefore, metrics of two alternative paths are calculted for two possible new states from each old state. A phase state is assigned to each correlative state. The previous phase state $\phi(kT)$ is estimated for each old state separately by applying the surviving path that leads to the phase in question. The next phase state $\phi(kT+T)$ of each new surviving trellis state $(\alpha_k, \alpha_{k+1})$ is calculated in parallel with the new metric and no toilsome back-tracing is needed. After rotation by $-\phi(kT+T)$ and carrier estimate rotation, the argument of the received complex sample is zero, and the transition metric of the transition in question is simply the real part of the rotated sample.

This example does not restrict application of the method in any way. FIG. 4 shows part of a trellis. The horizontal axis 400 represents time. In this example, there are four different trellis sates: the row the first point of which is 408, (1,1), the row the first point of which is 410 (1,–1), the row the first point of which is 412 (–1,1) and the row the first point of which is 414 (–1,–1). The numbers in the brackets represent received bits. To keep the figure clearer, FIG. 4 shows only the path that has the largest metric 402 and paths joining to it. The original state of the trellis is $(\alpha_{-1}, \alpha_0) = (-1, -1)$ and phase state $\phi(0)=0$. First the path metrics and phase states of the survivors are calculated and saved.

Then the survivor with the largest metric at t=13 drawn by the line 404 in FIG. 4 is chosen and the trellis is traced back to t=3. A hard decision on the transmitted bit is the same as the old state's second bit, i.e. the one that drops out from the state sequence. In two first time instants this bit is –1 according to the initial setting; thus, the method is started at t=3. The soft decision TFM/Viterbi receiver determines that the polarity of an output bit is the same as its hard decision counterpart. In this example, the sign is positive if the hard decision on the current bit is one and negative in the case of zero. The absolute value, i.e., the weight of the output value is a measure of reliability of the decoded bit. Higher weight implies more a reliable decoding result. To demonstrate the obtaining of the weight, the very first time instants in the trellis will now be examined more closely.

First, the two paths joining to the new state of the best surviving path at t=3, i.e. the best survivor 402 and the concurrent path joining to it 404, are handled. Those paths come from old states having the same first bit and different second bits. Since the output value's polarity is determined according to the old state's second bit, those two paths give opposite hard decisions at t=3. Therefore, their metric difference in the new state is taken as the initial weight of the current bit. The concurrent path will be discarded when joining to the best survivor; thus, this is the last moment to apply its information.

Next, the time instant t=4 is handled, and the polarity and initial weight of the new bit are found out in a similar manner. After that, the previous weight is revised. The idea is that the best survivor 402 and the new concurrent path 406 may give opposite hard decisions at time instant t=3. If so, the weights at t=3 and t=4 are compared and the smaller one is selected as the weight of the demodulated bit at t=3. The idea behind the revision is that if the path 406 had been chosen instead of the path 402, an error both at t=3 and t=4 would have happened. Hence, a large metric difference at t=3 does not imply reliable transmission if the metric difference at time instant t=4 is small.

The survivor which has the largest branch metric is selected as the best survivor. This best survivor is traced back to survivor length (=10, or probably slightly less) time instants, and the sign and initial weight are determined there. Hence, a delay line (FIFO memory) is needed to preserve the earlier path metrics. After one revision the soft decision of the bit at time instant t=3 is outputted and the process continues similarly at time instant t=5. This time, there is no need to revise the weight at time instant t=3 any more, since a TFM demodulator inherently outputs errors in bursts of two adjacent bits according to formula (5).

Since the best survivor is established just after processing the survivor length of new samples, and in addition, the weighting is carried out afterwards, the end of the trellis is processed separately. A simple method is to pad the end of each frame with 12 tail bits and not to decode them at all. This works well, though the same performance with a smaller number of tail bits can be obtained by driving the modulator to a known correlative state at the end of a frame.

It should be noted that a channel code serially concatenated with the TFM modulator can utilise the soft decisions. Also an interleaver can be placed between the serially concatenated channel code and the TFM modulator and then turbo-like iterative decoding can be accomplished. The demodulator is able to accept additional reliability information provided by the soft decision channel decoder, and after a relative small number of iterations, essentially low error rates can be attained.

The method ends in block 320. Arrow 322 depicts the possibility of repeating the method described, starting from the sampling. In iterative decoding, the method can be repeated starting from block 310. Suppose we have obtained additional information on transition probabilities from the channel decoder. Then, it is possible to add this information to branch metrics and repeat the soft decision demodulation process in a turbo-like manner.

Figure 5:
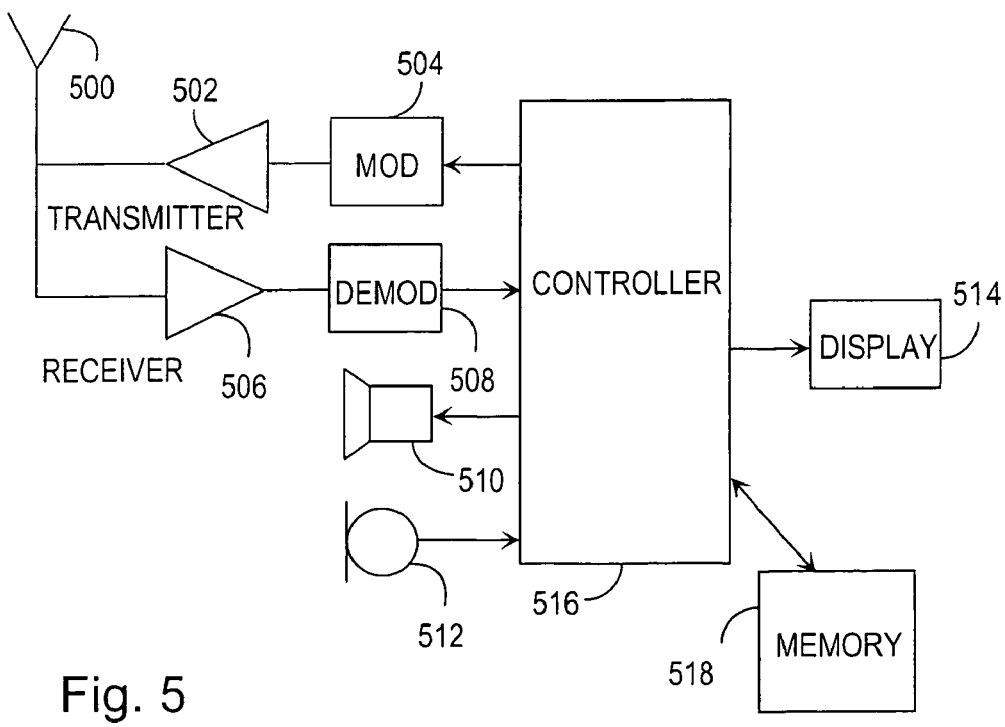
FIG. 5 is a block diagram illustrating a terminal of the radio system.

FIG. 5 is a block diagram illustrating a terminal of the radio system for implementing soft decision-making in detection of a TFM modulated signal. The receivers of the subscriber terminal and the base station or a similar part of the radio system perform partly the same functions that will be described in greater detail in connection with the description of the structure of the base station receiver. The terminal may be e.g. a mobile phone or a microcomputer, but the invention is not limited to these. The terminal described comprises an antenna 500, which is used for transmitting and receiving signals via a duplex filter. The terminal may also comprise several antennas or a multi-antenna system. The terminal further comprises a transmitter 502, which amplifies a modulated signal and transmits it to the antenna, a modulator 504, which modulates the carrier wave with a data signal including the desired information according to the selected modulation method, a receiver 506, which amplifies a signal arriving from the antenna and downconverts it to the selected intermediate frequency or directly to the baseband, a demodulator 508, which demodulates a received signal so that a data signal can be separated from the carrier wave.

The subscriber terminal also comprises a control block 516, which controls the function of the different terminal parts and performs functions needed to process the user's speech or the data generated by the user, such as DSP processing (Digital Signal Processing), D/A conversion and filtering. The control block also performs both encoding and decoding, such as channel coding and speech coding. Furthermore, in spread spectrum systems, such as the WCDMA, the spectrum of a signal is spread over a wide band in the transmitter by a pseudorandom spread code and composed in the receiver to increase the channel capacity. In addition, the control block adapts the signal and signal information to be transmitted to the air interface standard of the radio system used. The control block further comprises a program which controls the function of the terminal. The control block also performs phase rotation of a signal sample, calculates the transition and branch metrics and selects the best survivor in accordance with the embodiment to be described here.

The terminal further comprises a buffer memory 518, in which the best survivor and the paths related to it, for example, are stored.

The user interface of the terminal comprises a loudspeaker or an earpiece 510, a microphone 512, a display 514 and possibly a keyboard, which communicate with the control block.

The invention can be implemented by program, for instance, using hardware solutions providing the required functionality, for instance as ASIC (application-specific integrated circuit) or utilising separate logic components. The invention can also be implemented by hardware. In the selection of the implementation method person skilled in the art takes account of the requirements set for the size and power consumption of the device, the necessary processing capacity, production costs and production volumes.

Figure 6:
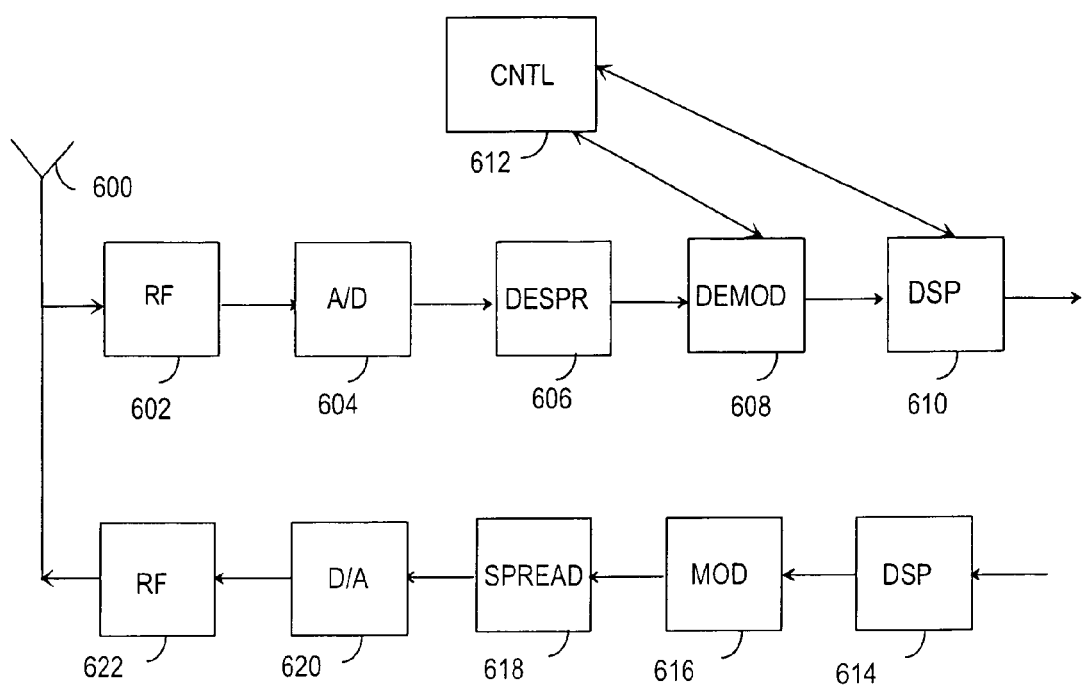
FIG. 6 is a block diagram illustrating an example of a base station transceiver.

Next the invention will be described with reference to FIG. 6, which is a block diagram illustrating, for the sake of clarity, a simplified example of a base station transceiver by means of an embodiment. It is clear to a person skilled in the art that the transceiver also includes other parts than those described above with reference to FIG. 6.

Blocks 614 to 622 illustrate a transmitter and blocks 602 to 610 illustrate a receiver. In the example of FIG. 6 the radio parts of the transmitter and the receiver are illustrated as separate parts but they can also be combined. The signal processing blocks 610 and 614 illustrate the parts of the base station that are needed to produce the user's speech or data in the transmitter. There may be only one signal processing block, or like in the example of the figure, one for the transmitter and one for the receiver. A signal, i.e. an information string consisting of symbols, i.e. one or more bits, is processed in the transmitter in various ways. Signal processing, which in coding, is usually performed in a DSP processor (Digital Signal Processing). If the transmission in the system consists of frames which consist of time slots, generation of the frames as well as interleaving of symbols are typically carried out in the DSP processor. In block 616 the signal is modulated by the desired modulation method. The purpose of signal coding and interleaving is to guarantee that the transmitted information can be restored in the receiver even though not all information bits could be received. Block 618 describes multiplication by a spread code which is performed on the information to be transmitted in the direct spread spectrum systems to spread a narrow band signal over a wide band. The signal is converted from the digital format into the analogue format in block 620. In the RF parts 622 the signal is upconverted to the selected transmission frequency, amplified and filtered, if necessary. In the example of the figure both the transmitter and the receiver have the same antenna 600, and thus a duplex filter is needed to separate the signal to be transmitted from the signal to be received. The antenna can be a single antenna or an array antenna consisting of several antenna elements.

The receiver comprises RF parts 602 where the received signal is filtered, downconverted either directly to the baseband or to an intermediate band and amplified. In block 604 the signal is converted from the analogue format into the digital format by sampling and quantisizing. In block 606 the direct spread wideband signal is composed by multiplying it by a code sequence generated by the code generator. In block 608 the influence of the carrier wave is eliminated from the signal by demodulating, and in block 610 the necessary signal processing is carried out, e.g. deinterleaving, decoding and decryption.

Furthermore, either the base station or the base station controller comprises a control part 612, which in the solution according to the embodiment described here controls phase rotation of a signal sample, calculates the transition and branch metrics and selects the best survivor. The best survivor and the paths related to it are stored in a buffer memory, which in this solution is arranged in the control part.

The invention can be implemented by program, for instance, using hardware solutions providing the required functionality, for instance as ASIC (application-specific integrated circuit) or utilising separate logic components. The invention can also be implemented by hardware. In the selection of the implementation method a person skilled in the art takes account of the requirements set for the size and power consumption of the device, the necessary processing capacity, production costs and production volumes.

Even though the invention has been explained in the above with reference to an example in accordance with the accompanying drawings, it is obvious that the invention is not restricted to it but can be modified in many ways within the scope of the inventive idea disclosed in the attached claims.

I claim:

1. A method for obtaining a soft decision in detection of a TFM signal, comprising:

sampling a received signal, reverse rotating the phase of a signal sample in the way that the real part of a complex signal indicates the phase of the sample to produce phase changes of possible transitions, reverse rotating the phase changes of possible transitions determined by the modulation method used so that the rotation is opposite to the phase belonging to the old state of a trellis diagram, computing transition metrics for the state transitions in a trellis diagram with the aid of the real part of the signal sample and computing path metrics for each survivor path, selecting the path with larger metrics as a survivor from paths entering a state node, and the phase of that survivor is set as the phase state of the new correlative state in question, selecting the survivor with the largest metric as the best survivor, determining the sign of the demodulated bit with the aid of the last bit of the previous state of the best survivor and calculating the weight of the demodulated bit as the difference of the path metrics of the best survivor and a selected path joining it.

2. A method for obtaining a soft decision in detection of a TFM signal, comprising:
   sampling a received signal,
   reverse rotating the phase of a signal sample in the way that the real part of a complex signal indicates the phase of the sample to produce phase changes of possible transitions,
   reverse rotating the phase changes of possible transitions determined by the modulation method used so that the rotation is opposite to the phase belonging to the old state of a trellis diagram,
   rotating a carrier phase,
   computing transition metrics for the state transitions in a trellis diagram with the aid of the real part of the signal sample and computing path metrics for each survivor path,
   selecting the path with larger metrics as a survivor from paths entering to a state node, and the phase of that survivor is set as the phase state of the new correlative state in question,
   selecting the survivor with the largest metric as the best survivor,
   determining the sign of the demodulated bit with the aid of the last bit of the previous state of the best survivor and calculating the weight of the demodulated bit as the difference of the path metrics of the best survivor and a selected path joining it.

3. A method for obtaining a soft decision in detection of a TFM signal, comprising:
   sampling a received signal,
   reverse rotating the phase of a signal sample in the way that the real part of a complex signal indicates the phase of the sample to produce phase changes of possible transitions,
   reverse rotating the phase changes of possible transitions determined by the modulation method used so that the rotation is opposite to the phase belonging to the old state of a trellis diagram,
   computing transition metrics for the state transitions in a trellis diagram with the aid of the real part of the signal sample using two earlier symbols as an original state of the trellis and computing path metrics for each survivor path,
   selecting the path with larger metrics as a survivor from paths entering a state node, and the phase of that survivor is set as the phase state of the new correlative state in question,
   selecting the survivor with the largest metric as the best survivor,
   determining the sign of the demodulated bit with the aid of the last bit of the previous state of the best survivor and calculating the weight of the demodulated bit as the difference of the path metrics of the best survivor and a selected path joining it.

4. A method for obtaining a soft decision in detection of a TFM signal, comprising:
   sampling a received signal,
   reverse rotating the phase of a signal sample in the way that the real part of a complex signal indicates the phase of the sample to produce phase changes of possible transitions,
   reverse rotating the phase changes of possible transitions determined by the modulation method used so that the rotation is opposite to the phase belonging to the old state of a trellis diagram,
   rotating a carrier phase,
   computing transition metrics for the state transitions in a trellis diagram with the aid of the real part of the signal sample using two earlier symbols as the original state of the trellis and computing path metrics for each survivor path,
   selecting the path with larger metrics as a survivor from pathsentering a state node, and the phase of that survivor is set as the phase state of the new correlative state in question,
   selecting the survivor with the largest metric as the best survivor,
   determining the sign of the demodulated bit with the aid of the last bit of the previous state of the best survivor and calculating the weight of the demodulated bit as the difference of the path metrics of the best survivor and a selected path joining it.

5. A method according to claim 1, 2, 3 or 4, wherein the rotation of the phase of the signal is carried out by a phase state rotation and a carrier phase rotation.

6. A method according to claim 1, 2, 3 or 4, wherein a e difference of two consequent symbol instants is $$\phi(kT+T)-\phi(kT)=(\pi/2)\cdot(\alpha_{k-1}/4+\alpha_k/2+\alpha_{k+1}/4).$$

7. A method according to claim 1, 2, 3 or 4, wherein the signal sample is rotated towards the horizontal axis, i.e. x axis.

8. A method according to claim 1, 2, 3 or 4, wherein the transition metrics and branch metrics are computed by using a Viterbi algorithm or the like.

9. A method according to claim 1, 2, 3 or 4, wherein the weight of the output value is a measure of reliability of the decoded bit.

10. A method according to claim 1, 2, 3 or 4, wherein the modulator is driven into a known state at the end of a frame by supplementing the end of each frame with 12 undecoded tail bits.

11. A method according to claim 1, 2, 3 or 4, wherein a reliability figure is used as feedback information in the demodulator.

12. A method according to claim 1, 2, 3 or 4, wherein the smaller one of the current or previous weights is assigned to the weight of the previous bit.

13. A method according to claim 1, 2, 3 or 4, wherein the sign of the demodulated bit is determined by the best survivor.

14. A method according to claim 1, 2, 3 or 4, wherein feedback information is offered on selecting survivors and calculating phase states to rotate possible transitions determined by the modulation method used.

15. A method according to claim 1, 2, 3 or 4, wherein the computed path metrics are taken into the calculation of weighting as calculation information.

16. A method according to claim 1, 2, 3 or 4, wherein the computed path metrics are passed via a delay line to the calculation of the weight of demodulated bits at a later time instant.

17. A receiver for obtaining a soft decision in detection of a TFM signal comprising:
   means for sampling a received signal,
   means for reverse rotating the phase of a signal sample in the way that the real part of a complex signal indicates the phase of the sample to produce phase changes of possible transitions,
   means for reverse rotating the phase changes of possible transitions determined by the modulation method used so that the rotation is opposite to the phase belonging to the old state of a trellis diagram, means for computing transition metrics for the state transitions in a trellis diagram with the aid of the real part of the signal sample and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

18. A receiver for obtaining a soft decision in detection of a TFM signal comprising:

means for sampling a received signal, means for reverse rotating the phase of a signal sample in the way that the real part of a complex signal indicates the phase of the sample to produce phase changes of possible transitions, means for reverse rotating the phase changes of possible transitions determined by the modulation method used so that the rotation is opposite to the phase belonging to the old state of a trellis diagram, means for rotating a carrier phase, means for computing transition metrics for the state transitions in a trellis diagram with the aid of the real part of the signal sample and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

19. A receiver for obtaining a soft decision in detection of a TFM signal comprising:

means for sampling a received signal, means for reverse rotating the phase of a signal sample in the way that the real part of a complex signal indicates the phase of the sample to produce phase changes of possible transitions, means for reverse rotating the phase changes of possible transitions determined by the modulation method used so that the rotation is opposite to the phase belonging to the old state of a trellis diagram, means for computing transition metrics for the state transitions in a trellis diagram with the aid of the real part of the signal sample using two earlier symbols as an original state of the trellis and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

20. A receiver for obtaining a soft decision in detection of a TFM signal comprising:

means for sampling a received signal, means for reverse rotating the phase of a signal sample in the way that the real part of a complex signal indicates the phase of the sample, means for reverse rotating the phase changes of possible transitions determined by the modulation method used so that the rotation is opposite to the phase belonging to the old state of a trellis diagram, means for rotating a carrier phase, means for computing transition metrics for the state transitions in a trellis diagram with the aid of the real part of the signal sample using two earlier symbols as the original state of the trellis and computing path metrics for each survivor path, means for selecting the path with larger metrics as a survivor from paths entering a state node, and the phase of that survivor is set as the phase state of the new correlative state in question, means for selecting the survivor with the largest metric as the best survivor, means for determining the sign of the demodulated bit with the aid of the last bit of the previous state of the best survivor and calculating the weight of the demodulated bit as the difference of the path metrics of the best survivor and a selected path joining it.

21. A receiver according to claim 17, 18, 19 or 20, wherein the receiver is arranged to carry out the rotation of the phase of the signal by a phase state rotation and a carrier phase rotation.

22. A receiver according to claim 17, 18, 19 or 20, wherein a phase difference of two consequent symbol instants is $$\phi(kT+T)-\phi(kT)=(\pi/2)\cdot(\alpha_{k-1}/4+\alpha_k/2+\alpha_{k+1}/4).$$

23. A receiver according to claim 17, 18, 19 or 20, wherein the receiver is arranged to rotate the signal sample towards the horizontal axis, i.e. x axis.

24. A receiver according to claim 17, 18, 19 or 20, wherein the receiver is arranged to compute the transition metrics and branch metrics by using a Viterbi algorithm or the like.

25. A receiver according to claim 17, 18, 19 or 20, wherein the weight of the output value is a measure of reliability of the decoded bit.

26. A receiver according to claim 17, 18, 19 or 20, wherein the receiver is arranged to drive the modulator into a known state at the end of a frame by supplementing the end of each frame with 12 undecoded tail bits.

27. A receiver according to claim 17, 18, 19 or 20, wherein the receiver is arranged to use a reliability figure as feedback information in the demodulator.

28. A receiver according to claim 17, 18, 19 or 20, wherein the receiver is arranged to assign the smaller one of the current or previous weights to the weight of the previous bit.

29. A receiver according to claim 17, 18, 19 or 20, wherein the receiver is arranged to determine the sign of the demodulated bit by the best survivor.

30. A receiver according to claim 17, 18, 19 or 20, wherein the receiver is arranged to offer feedback information on selecting survivors and calculating phase states to rotate possible transitions determined by the modulation method used.

31. A receiver according to claim 17, 18, 19 or 20, wherein the receiver is arranged to take the computed path metrics into the calculation of weighting as calculation information.

32. A receiver according to claim 17, 18, 19 or 20, wherein the receiver is arranged to pass the computed path metrics via a delay line to the calculation of the weight of demodulated bits at a later time instant.

* * * * *